United States Patent
Kimura

(10) Patent No.: US 7,542,637 B2
(45) Date of Patent: Jun. 2, 2009

(54) COUPLING OPTICAL SYSTEM, OPTICAL ELEMENT AND OPTICAL PICKUP APPARATUS

(75) Inventor: Tohru Kimura, Hachioji (JP)

(73) Assignee: Konica Minolta Opto, Inc., Tokyo (JP)

( * ) Notice: Subject to any disclaimer, the term of this patent is extended or adjusted under 35 U.S.C. 154(b) by 0 days.

(21) Appl. No.: 11/961,838

(22) Filed: Dec. 20, 2007

(65) Prior Publication Data

US 2008/0212924 A1   Sep. 4, 2008

(30) Foreign Application Priority Data

Dec. 25, 2006   (JP) .............................. 2006-347889

(51) Int. Cl.
*G02B 6/32* (2006.01)
*G11B 7/135* (2006.01)

(52) U.S. Cl. .............................. 385/33; 385/31; 385/88; 385/92; 369/112.26; 369/112.2; 369/112.06

(58) Field of Classification Search .................. 385/14, 385/31, 32, 33, 88, 89, 92; 369/44.11, 44.17, 369/44.21, 44.22, 44.31, 44.33, 112.08, 112.09, 369/112.13, 112.2, 112.23, 112.24, 112.26, 369/112.06

See application file for complete search history.

(56) References Cited

U.S. PATENT DOCUMENTS

| 6,671,247 B1 * | 12/2003 | Arai et al. | 369/112.01 |
| 7,173,897 B2 * | 2/2007 | Arai et al. | 369/112.08 |
| 7,460,460 B2 * | 12/2008 | Kimura | 369/112.23 |
| 7,463,570 B2 * | 12/2008 | Kimura et al. | 369/112.23 |
| 2008/0212924 A1 * | 9/2008 | Kimura | 385/33 |

FOREIGN PATENT DOCUMENTS

JP   2002-82280   3/2002   .............. 385/33 X

* cited by examiner

*Primary Examiner*—Brian M Healy
(74) *Attorney, Agent, or Firm*—Finnegan, Henderson, Farabow, Garrett & Dunner, L.L.P.

(57) ABSTRACT

The present invention relates to a coupling optical system, an optical element, and an optical pickup apparatus. A coupling optical system is provided for use in an optical pickup apparatus and is arranged between a light source and an objective lens of the optical pickup apparatus. The coupling optical system includes: a first optical element with a power; and a second optical element with a positive power. The first optical element includes an optical surface, an out-effective-aperture section surrounding the optical surface, and a light-reduction structure arranged on the out-effective-aperture section. When a non-parallel light flux emitted from the light source enters into the out-effective-aperture section, the light-reduction structure reduces a light flux to be emitted from the second optical element in a direction getting closer to an optical axis of the second optical element.

25 Claims, 7 Drawing Sheets

COUPLING OPTICAL SYSTEM, OPTICAL ELEMENT AND OPTICAL PICKUP APPARATUS

This application is based on Japanese Patent Application No. 2006-347889 filed on Dec. 25, 2006, in Japanese Patent Office, the entire content of which is hereby incorporated by reference.

TECHNICAL FIELD

The present invention relates to a coupling optical system, an optical element and an optical pickup apparatus, and in particular, to a coupling optical system, an optical element and an optical pickup apparatus which are suitable for conducting recording and/or reproducing of information for high density optical discs.

BACKGROUND

There are two standards for a high density optical disc that conducts recording and/or reproducing (hereinafter referred to as "recording/reproducing") of information by using a violet semiconductor laser with a wavelength of 405 nm. The two standards include HD DVD (hereinafter referred to as HD) that conducts recording/reproducing of information by using an objective lens having NA 0.65 and Blu-ray Disc (hereinafter referred to as BD) that conducts recording/reproducing of information by using an objective lens having NA 0.85. On the HD, it is possible to record information of 15 GB per one layer. On the BD, it is possible to record information of 25 GB per one layer. Hereafter, the optical disc of this kind is called "high density disc" in the present specification.

In an ordinary optical pickup apparatus such as one shown in Japanese Patent Publication open to Public Inspection No. 2002-082280, a light flux emitted from a semiconductor laser is changed in terms of an angle of divergence properly through a coupling lens (including a collimating lens), to enter an objective lens.

SUMMARY

In the optical pickup apparatus, it has been cleared that a light flux passing through a portion outside an effective aperture of a coupling lens enters an effective aperture of an objective lens under a certain service condition, and that it generates a ghost. This will be explained as follows, referring to FIG. 6.

FIG. 6 is a sectional view of an example showing an optical system of an optical pickup apparatus, and an actual distance between elements in the axial direction is shown with being changed for easy understanding. In the drawing, a divergent light flux emitted from light source P travels as shown with dotted lines, then, is changed in terms of an angle of divergence by the first lens CUL. The light flux is further converted into a parallel light flux by the second lens COL. After that, only a light flux within an effective aperture enters into objective lens OBJ through diaphragm AP to be converged on an information recording surface of optical disc OD. Therefore, a light flux outside the effective aperture is regulated by diaphragm AP in the original design, and it should not enter objective lens OBJ.

Incidentally, the coupling lens of a certain type includes intermediate surface IP that is perpendicular to an optical axis of the coupling lens, and is provided between flange section FL and optical surface S1 on the light source side for the purpose of giving a mark showing a die. However, because of the intermediate surface IP of this kind thus provided, a part of the light flux that has traveled outside the effective aperture and passed through the intermediate surface IP sometimes passes through optical surface S2 on the optical disc side to be refracted as shown with solid lines in FIG. 6. The refracted light sometimes enters within a range of diaphragm AP as a converged light. If this light flux outside the effective aperture is converged by objective lens OBJ, there is a fear that the converged light is detected as stray light by a photodetector to cause errors.

The invention has been achieved, in view of the problem stated above, to provide a coupling optical system, an optical element and an optical pickup apparatus which can control erroneous detection of the photodetector, and can conduct recording/reproducing of information properly.

A coupling optical system relating to the present invention is provided for use in an optical pickup apparatus and is arranged between a light source and an objective lens of the optical pickup apparatus. The coupling optical system includes a first optical element with a power; and a second optical element with a positive power. The first optical element includes an optical surface, an out-effective-aperture section surrounding the optical surface, and a light-reduction structure arranged on the out-effective-aperture section. In the coupling optical system, when a non-parallel light flux emitted from the light source enters into the out-effective-aperture section, the light-reduction structure reduces a light flux to be emitted from the second optical element in a direction getting closer to an optical axis of the second optical element in comparison with a direction traveling parallel to the optical axis.

These and other objects, features and advantages according to the present invention will become more apparent upon reading of the following detailed description along with the accompanied drawings.

BRIEF DESCRIPTION OF THE DRAWINGS

Embodiments will now be described, by way of example only, with reference to the accompanying drawings which are meant to be exemplary, not limiting, and wherein like elements numbered alike in several Figures, in which.

DESCRIPTION OF THE PREFERRED EMBODIMENT

Figure 1:
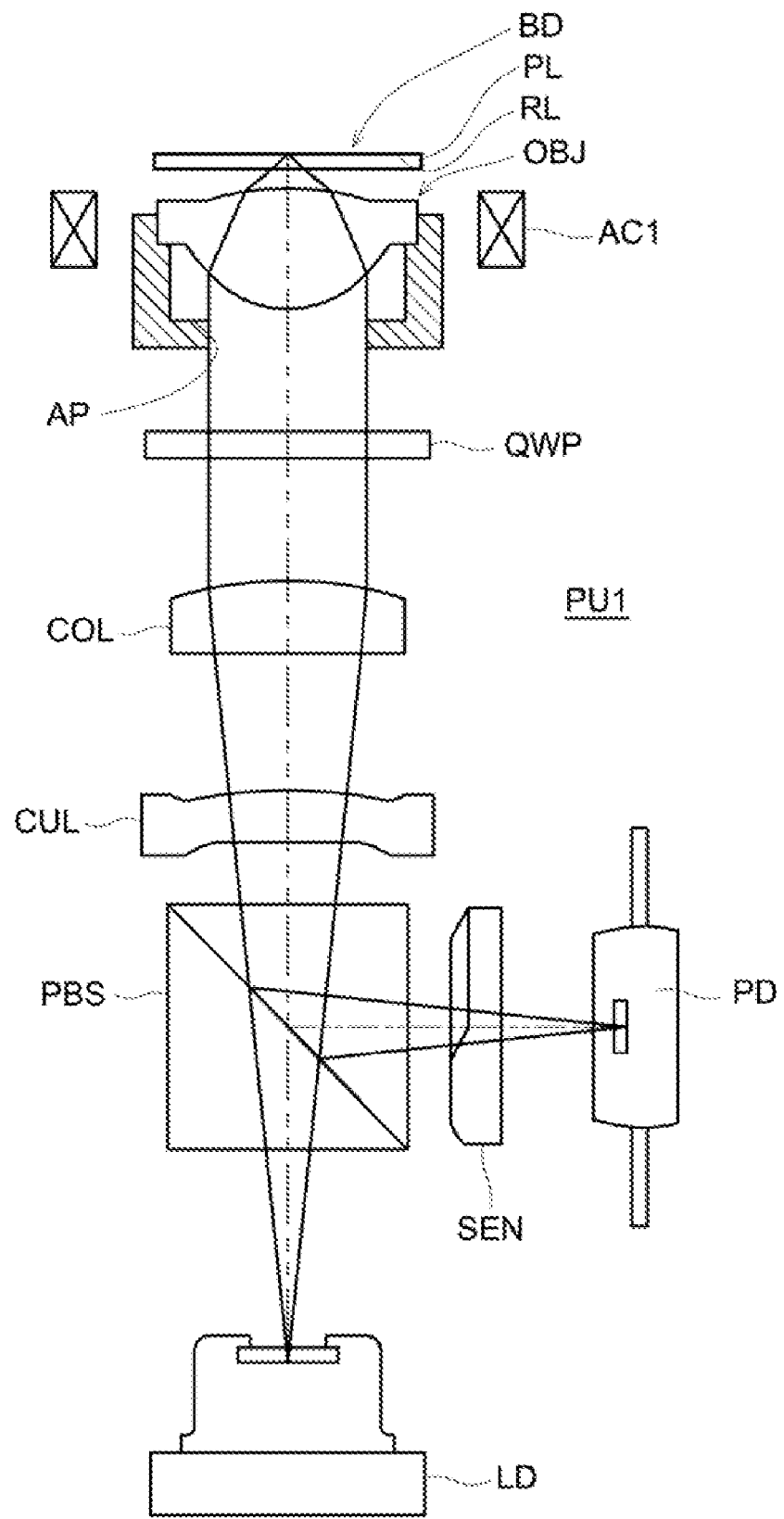
FIG. 1 is a diagram showing the structure of optical pickup apparatus PU1 schematically.

Preferred embodiments of the invention will be explained as follows.

A first embodiment of the present invention is a coupling optical system provided for use in an optical pickup apparatus which comprises a light source, and an objective lens, and which records and/or reproduces information by converging a light flux emitted from the light source onto an information recording surface of an optical information recording medium through the objective lens. The coupling optical system is arranged between the light source and the objective lens. The coupling optical system comprises: a first optical element with a power adopted to be arranged in a non-parallel light flux between the light source and the objective lens; and a second optical element with a positive power arranged between the first optical element and the objective lens. The first optical element comprises an optical surface, an out-effective-aperture section surrounding the optical surface, and a light-reduction structure arranged on the out-effective-aperture section. In the coupling optical system, when a non-parallel light flux emitted from the light source enters into the out-effective-aperture section, the light-reduction structure reduces a light flux to be emitted from the second optical element in a direction getting closer to an optical axis of the second optical element in comparison with a direction traveling parallel to the optical axis.

In the coupling optical system relating to the invention, there is formed a light-reduction structure outside an effective aperture of the first optical element. When a non-parallel light flux emitted from a light source enters the out-effective-aperture section of the first optical element, the light-reduction structure reduces an amount of a light flux which passes through the second optical element and is emitted in the direction getting closer to the optical axis rather than traveling parallel with an optical axis. Therefore, under the condition that a non-parallel light flux enters the aforesaid out-effective-aperture section of the first optical element, it controls the light flux to enter the inside of an effective aperture of the objective lens after the light flux passes through the second optical element and is refracted by the second optical element. Thereby, it reduces the light flux to be detected by a photodetector of the optical pickup apparatus as stray light, thus, generation of errors can be controlled.

In the above embodiment, the light-reduction structure may be a surface inclining to a plane perpendicular to the optical axis. Therefore, the structure allows the light flux which has passed through the out-effective-aperture portion to enter into the out of the effective aperture of the objective lens.

In the above embodiment, the light-reduction structure may be a surface in a shape formed by extending the optical surface.

In the above embodiment, the light-reduction structure may be a surface structure scattering an incident light flux. Therefore, it allows a light flux having passed through the aforesaid out-effective-aperture section to enter the out of the effective-aperture of the objective lens. Examples of the aforesaid light-reduction structure include a structure whose surface roughness is great and a structure that is subjected to embossing.

In the above embodiment, the out-effective-aperture section may include information about a mold. Therefore, it allows easy judgment to identify the die by which the optical element is formed.

In the above embodiment, the optical surface may face the light source, and the light-reduction structure may be arranged on the out-effective-aperture section surrounding the optical surface.

In the above embodiment, the coupling optical system may further comprise a flange arranged at a periphery of the first optical element. Further, the optical surface may face the light source. The out-effective-aperture section may comprise a flange surface facing the light source, and an intermediate surface formed between the optical surface and the flange surface facing the light source. The intermediate surface may include the light-reduction structure, and the flange surface may include a surface structure scattering an incident light to the flange. Therefore, it controls a light flux emitted from on the flange surface not to be received by a photodetector of the optical pickup apparatus, and thereby, generation of further errors can be restricted. Incidentally, the surface of the flange section may either be continuous to or be separated from the intermediate surface.

In the above embodiment, the coupling optical system may further comprise a flange arranged at a periphery of the first optical element. Further, the optical surface may face the light source. The out-effective-aperture section may comprise a flange surface facing the light source, and an intermediate surface formed between the optical surface and the flange surface facing the light source. The intermediate surface may include the light-reduction structure, and the flange surface may incline to a plane perpendicular to an optical axis of the first optical element. Therefore, it controls a light flux emitted from on the flange surface not to be received by a photodetector of the optical pickup apparatus, and thereby, generation of further errors can be restricted. Incidentally, the surface of the flange section may either be continuous to or be separated from the intermediate surface.

In the above embodiment, the second optical element may be a collimating lens for converting a divergent light flux from the first optical element into a parallel light flux.

A second embodiment of the present invention is an optical pickup apparatus comprising: a light source; an objective lens; and any one of the above coupling optical systems arranged between the light source and the objective lens. The optical pickup apparatus records and/or reproduces information by converging a light flux emitted from the light source onto an information recording surface of an optical information recording medium through the coupling optical system and the objective lens.

A third embodiment of the present invention is an optical element provided for use in an optical pickup apparatus comprising a light source, a collimating lens, and an objective lens, and for recording and/or reproducing information by converging a light flux emitted from the light source onto an information recording surface of an optical information recording medium through the objective lens. The optical element comprises: an optical surface; and an out-effective-aperture section surrounding the optical surface. The out-effective-aperture section comprises an inclining surface inclining to a plane perpendicular to an optical axis of the optical element. The optical element has a power and is adopted to be arranged in a non-parallel light flux between the light source and the objective lens.

According to the above embodiment, the aforesaid out-effective-aperture section has an inclining surface that inclines to a plane perpendicular to the optical axis. Therefore, when a non-parallel light flux enters the out-effective-aperture section of the optical element, it controls a light flux passing through the collimating and entering into the inside of an effective aperture of the objective lens. Thereby, it restricts that the light flux is detected by a photodetector of the optical pickup apparatus as stray light, thus, generation of errors can be controlled.

In the above embodiment, the inclining surface may be a surface in a shape formed by extending the optical surface.

In the above embodiment, the out-effective-aperture section may include information about a mold.

In the above embodiment, the optical surface may face the light source, and the inclining surface may be formed on the out-effective-aperture section surrounding the optical surface.

In the above embodiment, the optical element may further comprise a flange arranged at a periphery of the optical element. Further, the optical surface may face the light source, and the out-effective-aperture section may comprise a flange surface facing the light source, and an intermediate surface formed between the optical surface and the flange surface facing the light source. The intermediate surface may include the inclining surface and the flange surface may include a surface structure scattering an incident light to the flange.

In the above embodiment, the optical element may further comprise a flange arranged at a periphery of the optical element. Further, the optical surface may face the light source, and the out-effective-aperture section may comprise a flange surface facing the light source, and an intermediate surface formed between the optical surface and the flange surface facing the light source. The intermediate surface may include the inclining surface, and the flange surface may inclines to a plane perpendicular to an optical axis of the optical element.

In the above embodiment, the optical element may be a coupling lens.

A fourth embodiment of the present invention is an optical pickup apparatus comprising: a light source; a collimating lens; an objective lens; and any one the above optical elements arranged between the light source and the collimating lens. The optical pickup apparatus records and/or reproduces information by converging a light flux emitted from the light source onto an information recording surface of an optical information recording medium through the optical element, the collimating lens and the objective lens.

A fifth embodiment of the present invention is an optical element for use in an optical pickup apparatus comprising a light source, a collimating lens, and an objective lens, and for recording and/or reproducing information by converging a light flux emitted from the light source onto an information recording surface of an optical information recording medium through the objective lens. The optical element comprises: an optical surface; and an out-effective-aperture section surrounding the optical surface and comprising a surface structure scattering an incident light. The optical element has a power and is adopted to be arranged in a non-parallel light flux between the light source and the objective lens.

According to the above embodiment, the aforesaid out-effective-aperture section has a surface structure that scatters an incident light flux. Therefore, under the condition that a non-parallel light flux enters the out-effective-aperture section of the optical element, it controls a light flux passing through the collimating lens and entering into the inside of an effective aperture of the objective lens. Thereby, it restricts that the light flux is detected by a photodetector of the optical pickup apparatus as stray light, thus, generation of errors can be controlled.

In the above embodiment, the out-effective-aperture section may include information about a mold.

In the above embodiment, the optical surface may face the light source, and the surface structure may be formed on the out-effective-aperture section surrounding the optical surface.

In the above embodiment, the optical element may further comprise a flange arranged at a periphery of the optical element. Further, the optical surface may face the light source, and the out-effective-aperture section may comprise a flange surface facing the light source and an intermediate surface formed between the optical surface and the flange surface facing the light source. The intermediate surface may include the surface structure, and the flange surface may include a surface structure scattering an incident light to the flange.

In the above embodiment, the optical element may further comprise a flange arranged at a periphery of the optical element. Further, the optical surface may face the light source, and the out-effective-aperture section may comprise a flange surface facing the light source and an intermediate surface formed between the optical surface and the flange surface facing the light source. The intermediate surface may include the surface structure and the flange surface may inclines to a plane perpendicular to an optical axis of the optical element.

In the above embodiment, the optical element may be a coupling lens.

A sixth embodiment of the present invention is an optical pickup apparatus comprising: a light source; a collimating lens; an objective lens; and any one of the above described optical elements arranged between the light source and the collimating lens. The optical pickup apparatus records and/or reproduces information by converging a light flux emitted from the light source onto an information recording surface of an optical information recording medium through the optical element, the collimating lens and the objective lens.

An objective lens sometimes means only a lens that has a light-converging function and is arranged at the position closest to the optical information recording medium side to face the optical information recording medium, under the state where the optical information recording medium is loaded in the optical pickup apparatus. However, in the present specification, when an optical pickup apparatus further includes an optical element or lens movable at least in the optical axis direction by an actuator together with the lens with light-converging function, an objective lens means, additionally to above, the whole including the lens with light-converging function, and the optical element and lens which are movable with the lens with light-converging function.

Accordingly, the invention provides a coupling optical system, an optical element and an optical pickup apparatus which can conduct recording/reproducing of information properly by controlling erroneous detection of a photodetector.

Embodiments of the invention will be explained as follows in detail, referring to the drawings. FIG. 1 is a diagram schematically showing the structure of optical pickup apparatus PU1 in the embodiment capable of conducting recording/reproducing of information properly for optical disc BD, where an optical disc is also called optical information recording medium. The optical pickup apparatus PU1 of this kind can be carried by various types of optical information reproducing apparatuses and optical information recording reproducing apparatuses. Between semiconductor laser LD as a light source and objective lens OBJ, a coupling optical system with two lens groups is constituted. In the optical system, there are arranged the first lens having positive power CUL (arranged on the light source side) and the second lens COL (arranged on the optical disc side), where the first lens is also called a coupling lens or the first optical element and the second lens is also called a collimating lens or the second optical element. Incidentally, coupling optical system may be constructed with three or more lens groups. Further, one element or a part of coupling optical systems with two or more lens groups may be picked up to be called a coupling lens.

A divergent light flux emitted from semiconductor laser LD passes through polarizing beam splitter PBS, then, is changed in terms of an angle of divergence when passing through the first lens CUL representing an optical element. The light flux is further converted into a parallel light flux by the second lens COL, and passes through λ/4 wavelength plate QWP and diaphragm AP. Then, the light flux is converged by objective lens OBJ on information recording surface RL through protective substrate PL (thickness t1) of optical disc BD, thus, a converged spot is formed on the information recording surface RL.

Then, the light flux is modulated by information pits on the information recording surface RL and passes again through objective lens OBJ, diaphragm AP, λ/4 wavelength plate QWP, second lens COL and the first lens CUL. Then, the light flux is reflected on the polarizing beam splitter PBS, and enters a light-receiving surface of photodetector PD through sensor lens SEN, thus, its output signals are used to obtain signals which are read from information recorded on optical disc BD.

Further, changes in quantity of light caused by changes in a form and changes in a position of the spot on photodetector PD are detected for detection of focusing and detection of track. Based on these detections, actuator AC1 moves objective lens OBJ so that a light flux emitted from semiconductor laser LD may be imaged on an information recording surface of optical disc BD.

Figure 2:
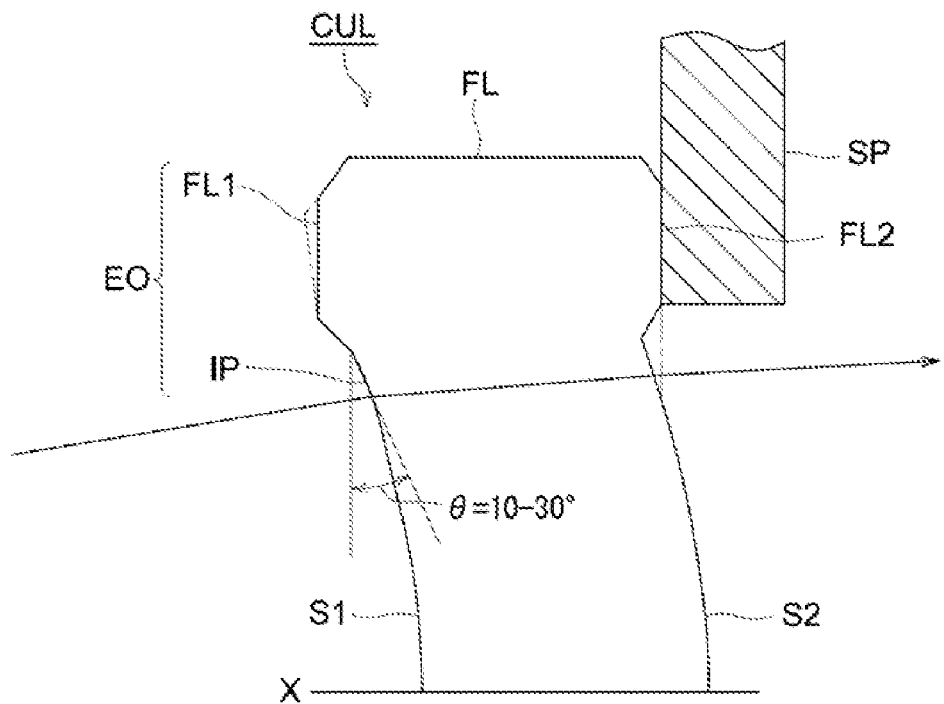
FIG. 2 is a sectional view of the first lens CUL relating to the present embodiment.

FIG. 2 is a sectional view of the first lens CUL relating to the present embodiment. In FIG. 2, the surface of the first lens CUL on the light source side includes: optical surface (which is also called an optical functional surface) S1 including optical axis X of the first lens CUL; flange surface FL1 on the light source side of flange section FL supported by supporting section SP on the periphery of the first lens CUL; and intermediate surface IP provided between optical surface S1 on the light source side and flange surface FL1 on the light source side. On the intermediate surface IP, there are provided small protrusions or depressions which are formed in the molding and transferring process of an optical element employing a die. These small protrusions or depressions function as a mark for identifying a die. Incidentally, the intermediate surface IP and the flange surface FL1 of the flange section FL on the light source side constitute an out-effective-aperture section EO.

In the present embodiment, intermediate surface IP inclines by angle θ=10°-30° to a plane that is perpendicular to optical axis X of the first lens CUL, which is called a tapered surface. When the intermediate surface IP inclines like this, it controls the divergent light flux entering the intermediate surface IP from entering the inside of an effective aperture of objective lens OL through the second lens COL, and erroneous detection can be controlled, which means that the so-called light-reduction structure is constituted. In the present embodiment, the intermediate surface IP has only to incline to a surface perpendicular to optical axis X of the first lens CUL, and it may also be a spherical surface or an aspheric surface which is extended from optical surface S1 on the light source side, in place of the tapered surface.

As another example of the light-reduction structure, a surface structure whose surface roughness is great may be formed on the intermediate surface IP, in place of tapering the intermediate surface IP. Specifically, on the die used for transferring and molding of the first lens CUL, the surface through which the intermediate surface IP is transferred is subjected to sandblasting process in advance to enhance its surface roughness. If the die of this kind is used for transferring and molding of the first lens CUL, the surface structure whose surface roughness has grown greater is formed on the intermediate surface IP. Owing to this, a light flux entering the intermediate surface IP is scattered, and thereby, the light flux that passes through the intermediate surface IP and enters the inside of an effective aperture of objective lens OL is regulated, and erroneous detection is further controlled. It is preferable that the surface roughness of the intermediate surface IP is 2 μm or more, and 4 μm or less on centerline average roughness Ra.

It is preferable that the flange surface FL1 of the first lens CUL on the light source side is made to be a tapered form tilted outward as shown with a one-dot chain line in FIG. 2, because a reflected light to enter photodetector PD is regulated. Alternatively, It is preferable to cause a surface roughness of the flange surface FL1 on the light source side to be greater in a method identical to that for the surface structure formed on the intermediate surface IP. Also, it is preferable that flange surface FL2 on the optical disc side is extended to intersect optical surface S2 as shown with a one-dot chain line in FIG. 2.

EXAMPLES

Preferred examples for the present embodiments will be explained as follows. Incidentally, hereafter (including lens data of Table), it is assumed that an exponent of 10 (for example, $2.5 \times 10^{-3}$) is expressed by using E (for example, 2.5 E−3).

In each example below, the same symbol is given to the same functional member for avoiding an overlap of explanations, and only portions which are different from FIG. 2 and from the embodiment will be explained.

Example 1

Figure 7:
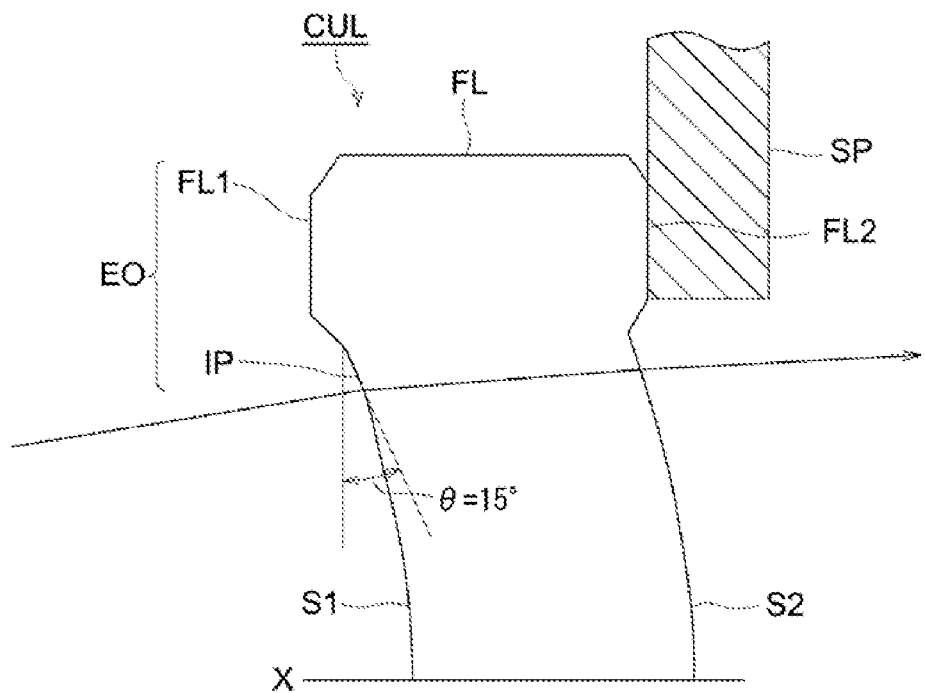
FIG. 7 is a sectional view of the first lens CUL relating to Example 1.

FIG. 7 is a sectional view of the first lens CUL relating to Example 1. In the Example 1, out-effective-aperture section EO includes intermediate surface IP that inclines by angle θ=15° to a plane perpendicular to optical axis X of the first lens CUL. The surface inclining by angle θ=15° constitutes the so-called light-reduction structure.

An optical surface of an optical system relating to the Example 1 is formed to be an aspheric surface that is established by a numerical expression where in a coefficient shown in Table 1 is substituted in each expression (1), and is axis-symmetrical about an optical axis.

$$z=(y^2/R)/[1+\sqrt{\{1-(\kappa+1)(y/R)^2\}}]+A_4y^4+A_6y^6+A_8y^8+A_{10}y^{10}+A_{12}y^{12}+A_{14}y^{14}+A_{16}y^{16}+A_{18}y^{18}+A_{20}y^{20} \quad (1)$$

In the expression above, z represents aspheric surface form (a distance in the direction parallel with an optical axis from a plane that is tangent to the aspheric surface at its vertex), y represents a distance from an optical axis, R represents a radius of curvature, κ represents a conic constant and each of $A_4$, $A_6$, $A_8$, $A_{10}$, $A_{12}$, $A_{14}$, $A_{16}$, $A_{18}$ and $A_{20}$ represent an aspheric surface coefficient.

TABLE 1

$\lambda = 408$ nm, $f_{OBJ} = 1.765$ mm, $NA_{OBJ} = 0.85$, $f_{CUP} = 18.522$ mm

[Paraxial data]

| Surface No. | r (mm) | d (mm) | $n_{408}$ | $\nu_d$ | Remarks |
|---|---|---|---|---|---|
| Object point | | 11.56538 | | | Point of emission |
| 1 | −5.34353 | 1 | 1.535620 | 55.0 | Coupling optical system |
| 2 | −11.25885 | 3 | | | |
| 3 | 77.28207 | 1.00000 | 1.535620 | 55.0 | |
| 4 | −6.98546 | 10 | | | |
| 5 | ∞ | 0 | | | Diaphragm (diameter 3.0 mm) |
| 6 | 1.218138 | 2.10000 | 1.604797 | 61.3 | Objective lens |
| 7 | −3.023813 | 0.55546 | | | |
| 8 | ∞ | 0.10000 | 1.621095 | 30.0 | Protective layer |
| 9 | ∞ | | | | |

[Aspheric surface coefficient]

| | $2^{nd}$ surface | $3^{rd}$ surface | $6^{th}$ surface | $7^{th}$ surface |
|---|---|---|---|---|
| κ | 0.3200000E−06 | −0.7109700E+00 | −0.6594410E+00 | −0.8172000E−02 |
| $A_4$ | 0.0000000E+00 | 0.0000000E+00 | 0.1679088E−01 | 0.1656192E+00 |
| $A_6$ | 0.0000000E+00 | 0.0000000E+00 | −0.2472631E−02 | −0.2897757E+00 |
| $A_8$ | 0.0000000E+00 | 0.0000000E+00 | 0.1183741E−01 | 0.3806798E+00 |
| $A_{10}$ | 0.0000000E+00 | 0.0000000E+00 | −0.9762069E−02 | −0.3557987E+00 |
| $A_{12}$ | 0.0000000E+00 | 0.0000000E+00 | 0.2607135E−02 | 0.1825885E+00 |
| $A_{14}$ | 0.0000000E+00 | 0.0000000E+00 | 0.3929923E−02 | −0.3828515E−01 |
| $A_{16}$ | 0.0000000E+00 | 0.0000000E+00 | −0.4321259E−02 | 0.0000000E+00 |
| $A_{18}$ | 0.0000000E+00 | 0.0000000E+00 | 0.1774576E−02 | 0.0000000E+00 |
| $A_{20}$ | 0.0000000E+00 | 0.0000000E+00 | −0.2761561E−03 | 0.0000000E+00 |

Figure 3:
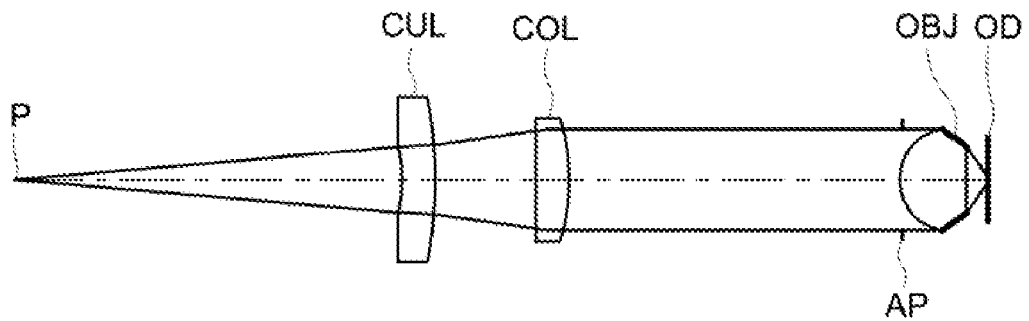
FIG. 3 is a diagram of an optical path of an optical system relating to the present example.

FIG. 3 is a diagram of an optical path of an optical pickup apparatus relating to Example 1. A divergent light flux emitted from semiconductor laser LD (point of emission P) travels as shown with solid lines, and it is converted in terms of an angle of divergence when it passes through the first lens CUL having positive power. Then, the light flux is further converted into a parallel light flux by the second lens COL having positive power. After that, only a light flux within an effective aperture of the first lens CUL passes through diaphragm AP, to be converged on an information recording surface of optical disc OD by objective lens OBJ.

Figure 4:
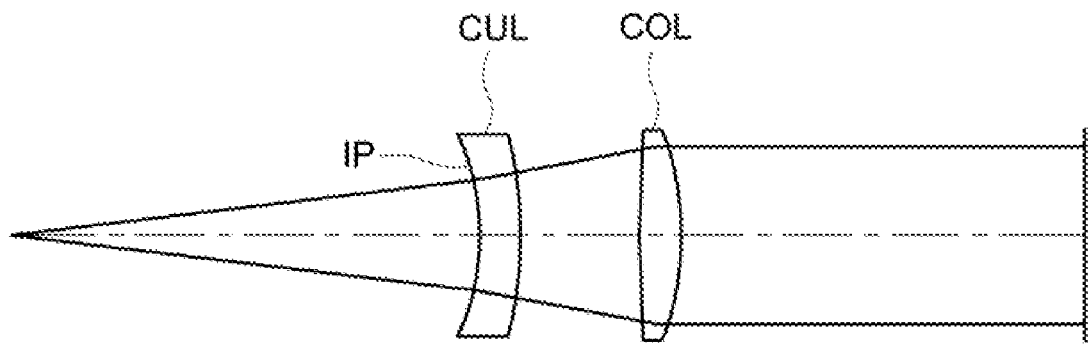
FIG. 4 is a diagram of an optical path under the condition that a light flux traveling outside an effective aperture enters into the first lens CUL of the optical system in examples.
Figure 5:
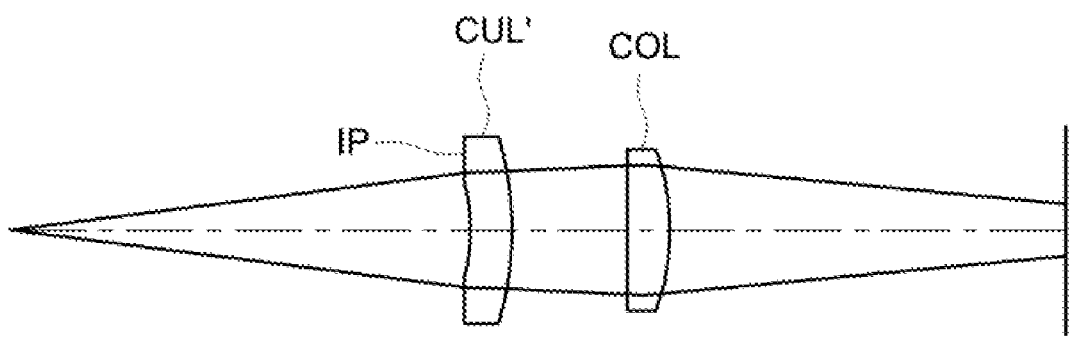
FIG. 5 is a diagram of an optical path under the condition that a light flux traveling outside an effective aperture enters into the first lens CUL' of the optical system in a comparative example.
Figure 6:
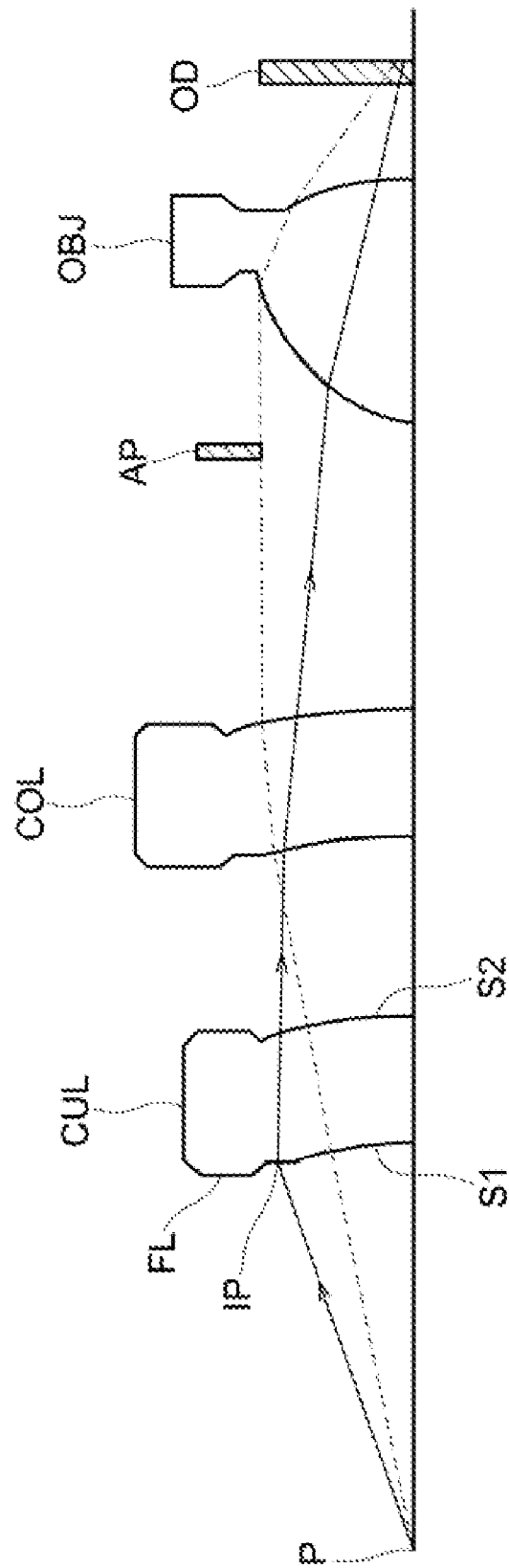
FIG. 6 is a diagram of an optical path of an optical system in a conventional example.

FIG. 4 is a diagram of an optical path under the condition that a light flux traveling outside an effective aperture enters into the first lens CUL in Example 1, and FIG. 5 is a diagram of an optical path under the condition that a light flux traveling outside an effective aperture enters into the first lens CUL in a comparative example. With respect to first lens CUL' of the comparative example, intermediate surface IP and flange surface FL1 are perpendicular to an optical axis of the first lens CUL', and none of them has the so-called light-reduction structure such as an inclining surface which inclines to a plane perpendicular to the optical axis, a surface in a form that is an extended optical surface and a surface structure that scatters an incident light flux. In contrast to this, with respect to the first lens CUL of Example 1, intermediate surface IP inclins by an angle of θ=15° to a plane perpendicular to the optical axis of the first lens CUL. The second lens COL is common for both the present example and the comparative example.

As is apparent from comparison between FIG. 4 and FIG. 5, a light flux passing through intermediate surface IP of the first lens CUL' and second lens COL in the comparative example becomes a converged light flux. While, a light flux passing through intermediate surface IP of the first lens CUL and second lens COL in Example 1 becomes mostly a parallel light flux, thus, it is regulated by diaphragm AP and is controlled to enter objective lens OBJ. Therefore, it restricts that a light flux that has passed through intermediate surface IP is detected as stray light by a photodetector of an optical pickup apparatus, and generation of errors can be regulated.

Example 2

Figure 8:
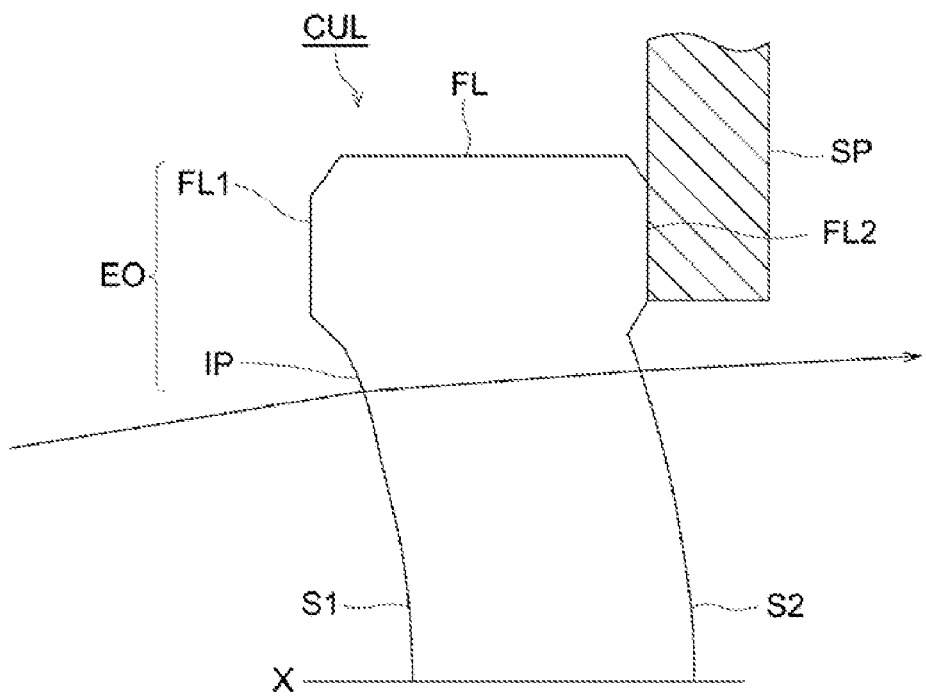
FIG. 8 is a sectional view of the first lens CUL relating to Example 2.

FIG. 8 is a sectional view of the first lens CUL relating to Example 2. In Example 2, out-effective-aperture section EO has intermediate surface IP that is composed of a surface in a shape formed by extending optical surface S1 of the first lens CUL on the light source side. The surface in a shape formed by extending optical surface S1 constitutes the so-called light-reduction structure.

An optical pickup apparatus, optical surface of a coupling optical system and a diagram of an optical path relating to Example 2 are the same to Example 1.

Now, an optical path under the condition that a light flux traveling outside an effective aperture enters into the first lens CUL in Example 2 is compared with an optical path under the condition that a light flux traveling outside an effective aperture enters into the first lens CUL in the comparative example. The comparative example employs those which are the same as ones in Example 1, and optical paths for Example 2 and the comparative example are the same as FIGS. 4 and 5.

In the first lens CUL in Example 2, the intermediate surface IP is composed of a surface in a shape formed by extending optical surface S1 of the first lens CUL on the light source side, while, the intermediate surface IP of the first lens CUL' of the comparative example are perpendicular to an optical axis of the first lens CUL'.

A light flux passing through intermediate surface IP of the first lens CUL' and second lens COL in the comparative example becomes a converged light flux. While, a light flux passing through intermediate surface IP of the first lens CUL and second lens COL in Example 2 becomes mostly a parallel light flux, thus, it is regulated by diaphragm AP and is controlled to enter objective lens OBJ. Therefore, it is restricted that a light flux that has passed through intermediate surface IP is detected as stray light by a photodetector of an optical pickup apparatus, and generation of errors can be regulated.

Example 3

Figure 9:
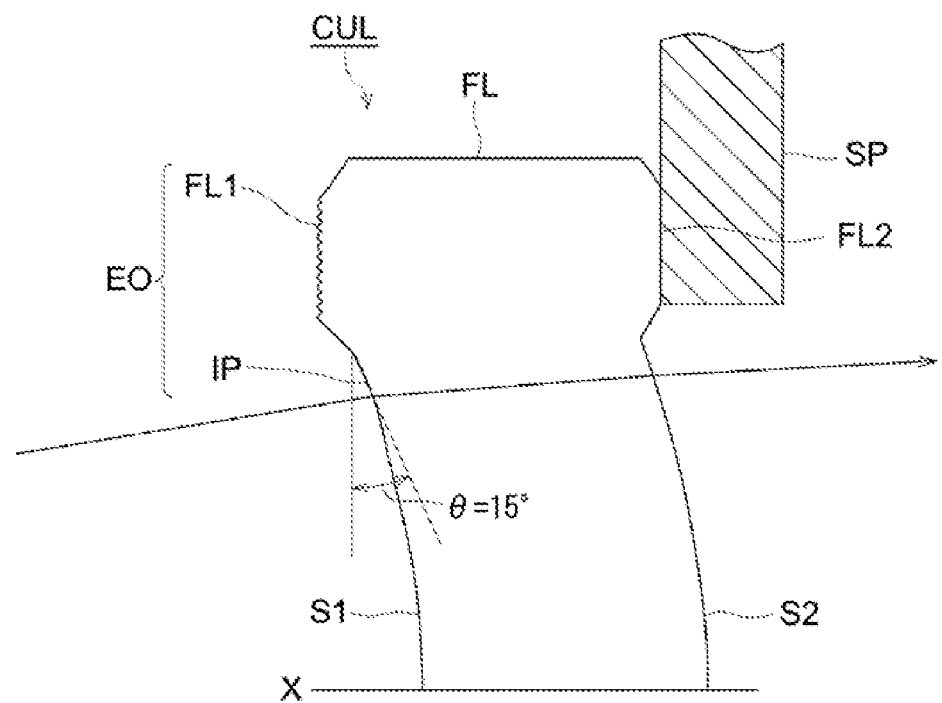
FIG. 9 is a sectional view of the first lens CUL relating to Example 3.

FIG. 9 is a sectional view of the first lens CUL relating to Example 3. In Example 3, out-effective-aperture section EO includes flange surface FL1 of the first lens CUL on the light source side and intermediate surface IP. The intermediate surface IP inclines by angle θ=15° to a plane perpendicular to optical axis X of the first lens CUL, and it constitutes the so-called light-reduction structure. On the flange surface FL1 of the first lens CUL on the light source side, there is formed a surface structure whose surface roughness is great.

An optical pickup apparatus, optical surface of a coupling optical system and a diagram of an optical path relating to Example 3 are the same to Example 1.

Now, an optical path under the condition that a light flux traveling outside an effective aperture enters into the first lens CUL in Example 3 is compared with an optical path under the condition that a light flux traveling outside an effective aperture enters into the first lens CUL in the comparative example. The comparative example employs those which are the same as ones in Example 1, and optical paths for Example 3 and the comparative example are the same as FIGS. 4 and 5.

While the intermediate surface IP inclines by angle θ=15° to the surface perpendicular to optical axis X of the first lens CUL in the first lens CUL in Example 3, intermediate surface IP of the first lens CUL' in the comparative example is perpendicular to an optical axis of the first lens CUL'.

A light flux passing through intermediate surface IP of the first lens CUL' and second lens COL in the comparative example becomes a converged light flux. While, a light flux passing through intermediate surface IP of the first lens CUL and second lens COL in Example 3 becomes mostly a parallel light flux, thus, it is regulated by diaphragm AP and is controlled to enter objective lens OBJ. Therefore, it is restricted that a light flux that has passed through intermediate surface IP is detected as stray light by a photodetector of an optical pickup apparatus, and generation of errors can be regulated.

Further, a surface structure whose surface roughness is great is formed on flange surface FL1 of the first lens CUL on the light source side, for the first lens CUL in Example 3, thus, a light flux entering the flange surface is scattered. Whereby, it is regulated that a light flux having passed through the flange surface enters an effective aperture of objective lens OL, and erroneous detections can be regulated.

Incidentally, though the out-effective-aperture section EO has flange surface FL1 having thereon the surface structure and intermediate surface IP that inclines to a plane perpendicular to the optical axis X in Example 3, the same effects can be obtained even when the intermediate surface IP is a surface in a shape formed by extending optical surface S1 as shown in FIG. 8, in place of inclining to the surface intersecting optical axis X at right angles. It is further possible to obtain the same effects even when the flange surface FL1 inclines to a plane perpendicular to the optical axis X as shown in FIG. 2, in place of having the surface structure.

Example 4

Figure 10:
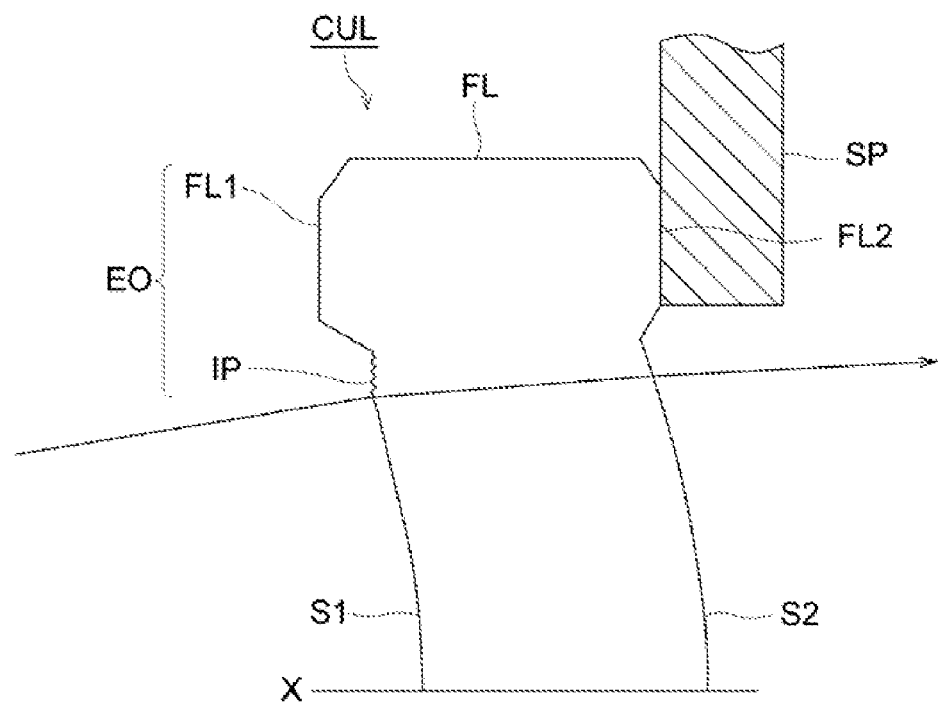
FIG. 10 is a sectional view of the first lens CUL relating to Example 4.

FIG. 10 is a sectional view of the first lens CUL relating to Example 4. In Example 4, out-effective-aperture section EO includes intermediate surface IP having a surface structure whose surface roughness is great. The surface structure scatters an incident light flux, and it constitutes the so-called light-reduction structure.

An optical pickup apparatus, an optical surface of a coupling optical system and a diagram of an optical path relating to Example 4 are the same to Example 1.

Now, an optical path under the condition that a light flux traveling outside an effective aperture enters into the first lens CUL in Example 4 is compared with an optical path under the condition that a light flux traveling outside an effective aperture enters into the first lens CUL in the comparative example. The comparative example employs those which are the same as ones in Example 1, and optical paths for Example 4 and the comparative example are the same as FIGS. 4 and 5.

A light flux passing through intermediate surface IP of the first lens CUL' and second lens COL in the comparative example becomes a converged light flux. While, a light flux entering intermediate surface IP of the first lens CUL in Example 4 is scattered by the surface structure, thus, it is regulated by diaphragm AP thereafter, and is controlled to enter objective lens OBJ. Therefore, it is restricted that a light flux that has passed through intermediate surface IP is detected as stray light by a photodetector of an optical pickup apparatus, and generation of errors can be regulated.

Example 5

Figure 11:
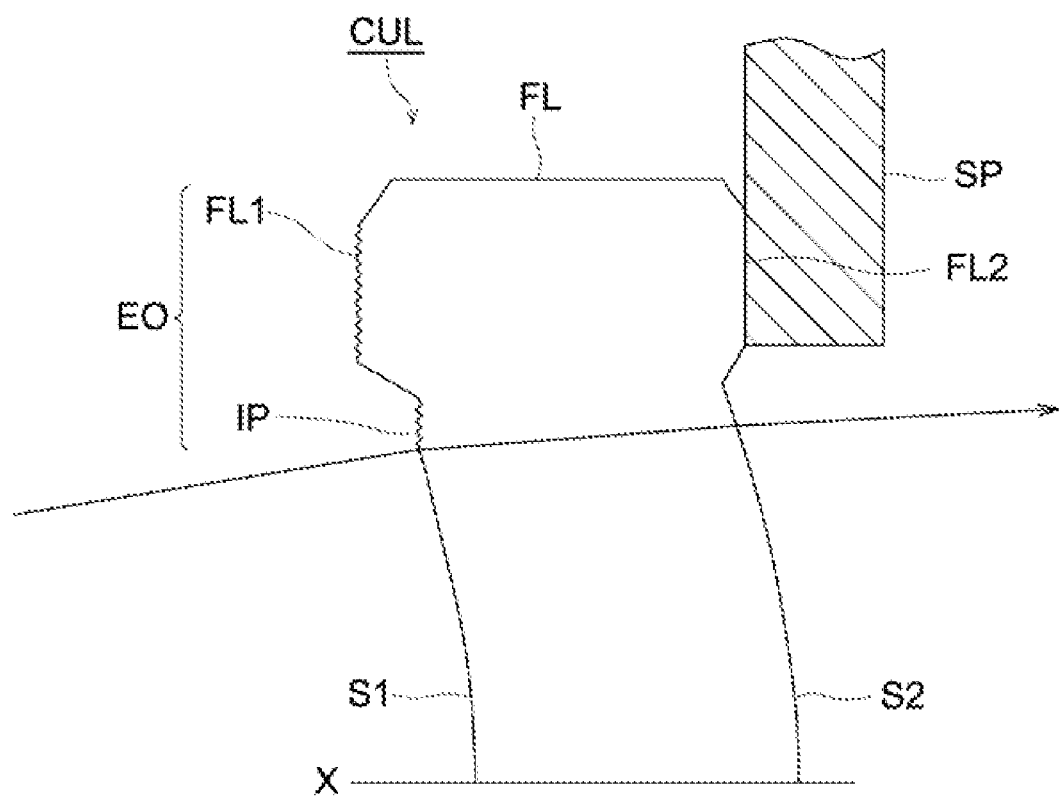
FIG. 11 is a sectional view of the first lens CUL relating to Example 5.

FIG. 11 is a sectional view of the first lens CUL relating to Example 5. In Example 5, out-effective-aperture section EO includes intermediate surface IP having a surface structure whose surface roughness is great. The surface structure scatters an incident light flux, and it constitutes the so-called light-reduction structure. On the flange surface FL1 of the first lens CUL on the light source side, there is formed a surface structure whose surface roughness is great.

An optical pickup apparatus, an optical surface of a coupling optical system and a diagram of an optical path relating to Example 5 are the same to Example 1.

Now, an optical path under the condition that a light flux traveling outside an effective aperture enters into the first lens CUL in Example 5 is compared with an optical path under the condition that a light flux traveling outside an effective aperture enters into the first lens CUL. The comparative example employs those which are the same as ones in Example 1, and optical paths for Example 5 and the comparative example are the same as FIGS. 4 and 5.

A light flux passing through intermediate surface IP of the first lens CUL' and second lens COL in the comparative example becomes a converged light flux. While, a light flux entering intermediate surface IP of the first lens CUL in Example 5 is scattered by the surface structure, thus, it is regulated by diaphragm AP thereafter, and is controlled to enter objective lens OBJ. Therefore, it is restricted that a light flux that has passed through intermediate surface IP is detected as stray light by a photodetector of an optical pickup apparatus, and generation of errors can be regulated.

Further, a surface structure whose surface roughness is great is formed on flange surface FL1 of the first lens CUL on the light source side, for the first lens CUL in Example 5, thus, a light flux entering the flange surface is scattered. Whereby, it is regulated that a light flux having passed through the flange surface enters an effective aperture of objective lens OL, and erroneous detections can be regulated.

The out-effective-aperture section ED includes flange surface FL1 having thereon the surface structure and intermediate surface IP having thereon the surface structure in Example 5. Alternatively, even when the flange surface FL1 inclines to the plane perpendicular to optical axis X as shown in FIG. 2, in place of having the surface structure, it is also possible to obtain the same effects.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

For example, each of the examples stated above employs for an optical pickup apparatus exclusively for BD as an example. However, the invention can also apply to an optical pickup apparatus that conducts recording/reproducing of information for any of HD, DVD and CD.

What is claimed is:

1. A coupling optical system for use in are optical pickup apparatus which comprises a light source, and an objective lens, and which records and/or reproduces information by converging a light flux emitted from the light source onto an information recording surface of an optical information recording medium through the objective lens, the coupling optical system being arranged between the light source and the objective lens, the coupling optical system comprising:
    a first optical element with a power adopted to be arranged in a non-parallel light flux between the light source and the objective lens; and
    a second optical element with a positive power arranged between the first optical element and the objective lens,
    wherein the first optical element comprises
        an optical surface,
        an out-effective-aperture section surrounding the optical surface, and
        a light-reduction structure arranged on the out-effective-aperture section, and
    wherein when a non-parallel light flux emitted from the light source enters into the out-effective-aperture section, the light-reduction structure reduces a light flux to be emitted from the second optical element in a direction getting closer to an optical axis of the second optical element in comparison with a direction traveling parallel to the optical axis.

2. The coupling optical system of claim 1,
    wherein the light-reduction structure is a surface inclining to a plane perpendicular to the optical axis.

3. The coupling optical system of claim 1,
    wherein the light-reduction structure is a surface in a shape formed by extending the optical surface.

4. The coupling optical system of claim 1,
    wherein the light-reduction structure is a surface structure scattering an incident light flux.

5. The coupling optical system of claim 1,
    wherein the out-effective-aperture section includes information about a mold.

6. The coupling optical system of claim 1,
    wherein the optical surface faces the light source, and
    the light-reduction structure is arranged on the out-effective-aperture section surrounding the optical surface.

7. The coupling optical system of claim 1, further comprising
    a flange arranged at a periphery of the first optical element,
    wherein the optical surface faces the light source, and
    the out-effective-aperture section comprises
        a flange surface facing the light source and including a surface structure scattering an incident light to the flange, and
        an intermediate surface formed between the optical surface and the flange surface facing the light source, the intermediate surface including the light-reduction structure.

8. The coupling optical system of claim 1, further comprising
    a flange arranged at a periphery of the first optical element,
    wherein the optical surface faces the light source, and
    the out-effective-aperture section comprises
        a flange surface facing the light source and inclining to a plane perpendicular to an optical axis of the first optical element, and
        an intermediate surface formed between the optical surface and the flange surface facing the light source, the intermediate surface including the light-reduction structure.

9. The coupling optical system of claim 1,
    wherein the second optical element is a collimating lens for converting a divergent light flux from the first optical element into a parallel light flux.

10. An optical pickup apparatus comprising:
    a light source;
    an objective lens; and
    the coupling optical system of claim 1 arranged between the light source and the objective lens,
    wherein the optical pickup apparatus records and/or reproduces information by converging a light flux emitted from the light source onto an information recording surface of an optical information recording medium through the coupling optical system and the objective lens.

11. An optical element for use in an optical pickup apparatus comprising a light source, a collimating lens, and an objective lens, and for recording and/or reproducing information by converging a light flux emitted from the light source onto an information recording surface of an optical information recording medium through the objective lens, the optical element comprising:
    an optical surface; and
    an out-effective-aperture section surrounding the optical surface and comprising an inclining surface inclining to a plane perpendicular to an optical axis of the optical element,
    wherein the optical element has a power and is adopted to be arranged in a non-parallel light flux between the light source and the objective lens.

12. The optical element of claim 11,
    wherein the inclining surface is a surface in a shape formed by extending the optical surface.

13. The optical element of claim 11,
    wherein the out-effective-aperture section includes information about a mold.

14. The optical element of claim 11,
    wherein the optical surface faces the light source, and
    the inclining surface is formed on the out-effective-aperture section surrounding the optical surface.

15. The optical element of claim 11, further comprising a flange arranged at a periphery of the optical element, wherein the optical surface faces the light source, and the out-effective-aperture section comprises
   a flange surface facing the light source and including a surface structure scattering an incident light to the flange, and
   an intermediate surface formed between the optical surface and the flange surface facing the light source, the intermediate surface including the inclining surface.

16. The optical element of claim 11, further comprising a flange arranged at a periphery of the optical element, wherein the optical surface faces the light source, and the out-effective-aperture section comprises
   a flange surface facing the light source and inclining to a plane perpendicular to an optical axis of the optical element, and
   an intermediate surface formed between the optical surface and the flange surface facing the light source, the intermediate surface including the inclining surface.

17. The optical element of claim 11, wherein the optical element is a coupling lens.

18. An optical pickup apparatus comprising:
   a light source;
   a collimating lens;
   an objective lens; and
   the optical element of claim 11 arranged between the light source and the collimating lens,
   wherein the optical pickup apparatus records and/or reproduces information by converging a light flux emitted from the light source onto an information recording surface of an optical information recording medium through the optical element, the collimating lens and the objective lens.

19. An optical element for use in an optical pickup apparatus comprising a light source, a collimating lens, and an objective lens, and for recording and/or reproducing information by converging a light flux emitted from the light source onto an information recording surface of an optical information recording medium through the objective lens, the optical element comprising:
   an optical surface; and
   an out-effective-aperture section surrounding the optical surface and comprising a surface structure scattering an incident light,
   wherein the optical element has a power and is adopted to be arranged in a non-parallel light flux between the light source and the objective lens.

20. The optical element of claim 19, wherein the out-effective-aperture section includes information about a mold.

21. The optical element of claim 19, wherein the optical surface faces the light source, and the surface structure is formed on the out-effective-aperture section surrounding the optical surface.

22. The optical element of claim 19, further comprising a flange arranged at a periphery of the optical element, wherein the optical surface faces the light source, and the out-effective-aperture section comprises
   a flange surface facing the light source and including a surface structure scattering an incident light to the flange, and
   an intermediate surface formed between the optical surface and the flange surface facing the light source, the intermediate surface including the surface structure.

23. The optical element of claim 19, further comprising a flange arranged at a periphery of the optical element, wherein the optical surface faces the light source, and the out-effective-aperture section comprises
   a flange surface facing the light source and inclining to a plane perpendicular to an optical axis of the optical element, and
   an intermediate surface formed between the optical surface and the flange surface facing the light source, the intermediate surface including the surface structure.

24. The optical element of claim 19, wherein the optical element is a coupling lens.

25. An optical pickup apparatus comprising:
   a light source;
   a collimating lens;
   an objective lens; and
   the optical element of claim 19 arranged between the light source and the collimating lens,
   wherein the optical pickup apparatus records and/or reproduces information by converging a light flux emitted from the light source onto an information recording surface of an optical information recording medium through the optical element, the collimating lens and the objective lens.

* * * * *